United States Patent
Ikeuchi et al.

(10) Patent No.: US 10,854,876 B2
(45) Date of Patent: *Dec. 1, 2020

(54) POSITIVE ELECTRODE ACTIVE MATERIAL AND BATTERY USING POSITIVE ELECTRODE ACTIVE MATERIAL

(71) Applicant: Panasonic Intellectual Property Management Co., Ltd., Osaka (JP)

(72) Inventors: Issei Ikeuchi, Osaka (JP); Ryuichi Natsui, Osaka (JP); Kensuke Nakura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/278,701

(22) Filed: Feb. 18, 2019

(65) Prior Publication Data

US 2019/0181443 A1 Jun. 13, 2019

Related U.S. Application Data

(63) Continuation of application No. PCT/JP2017/027997, filed on Aug. 2, 2017.

(30) Foreign Application Priority Data

Nov. 15, 2016 (JP) .................................. 2016-222124

(51) Int. Cl.
*H01M 4/505* (2010.01)
*H01M 10/0525* (2010.01)
(Continued)

(52) U.S. Cl.
CPC ............. *H01M 4/505* (2013.01); *C01B 11/24* (2013.01); *C01B 21/084* (2013.01);
(Continued)

(58) Field of Classification Search
CPC .... H01M 4/1315; H01M 4/525; H01M 4/505; H01M 4/131; H01M 4/58; H01M 4/485;
(Continued)

(56) References Cited

U.S. PATENT DOCUMENTS 6,037,095 A 3/2000 Miyasaka
6,416,902 B1 7/2002 Miyasaka
(Continued)

FOREIGN PATENT DOCUMENTS

CN 103928672 A 7/2014
EP 2921455 A1 9/2015
(Continued)

OTHER PUBLICATIONS

Kitajou et al., "Electrochemical Performance of a Novel Cathode material LiFeOF for Li-ion Batteries", Electrochemistry, 83(10), 885-888 (2015).*
(Continued)

*Primary Examiner* — Golam Mowla
(74) *Attorney, Agent, or Firm* — McDermott Will & Emery LLP

(57) ABSTRACT

A positive-electrode active material contains a compound represented by the following composition formula (1):

$$Li_xMe_yO_\alpha X_\beta \qquad (1)$$

where Me denotes one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er, X denotes two or more elements selected from the group consisting of F, Cl, Br, I, N, and S, and x, y, α, and β satisfy $0.75 \leq x \leq 2.25$, $0.75 \leq y \leq 1.50$, $1 \leq \alpha < 3$, and $0 < \beta \leq 2$, respectively. A crystal structure of the compound belongs to a space group Fm-3m.

14 Claims, 1 Drawing Sheet

(51) Int. Cl.

| | | |
|---|---|---|
| C01B 11/24 | (2006.01) | |
| C01B 21/084 | (2006.01) | |
| C01G 45/00 | (2006.01) | |
| H01M 4/525 | (2010.01) | |
| H01M 4/58 | (2010.01) | |
| H01M 4/485 | (2010.01) | |
| H01M 10/0565 | (2010.01) | |
| H01M 4/131 | (2010.01) | |
| H01M 4/1315 | (2010.01) | |
| C01G 51/00 | (2006.01) | |
| C01G 53/00 | (2006.01) | |
| H01M 10/0562 | (2010.01) | |
| H01M 4/02 | (2006.01) | |

(52) U.S. Cl.
CPC ......... *C01G 45/006* (2013.01); *C01G 51/006* (2013.01); *C01G 53/006* (2013.01); *H01M 4/131* (2013.01); *H01M 4/1315* (2013.01); *H01M 4/485* (2013.01); *H01M 4/525* (2013.01); *H01M 4/58* (2013.01); *H01M 10/0525* (2013.01); *H01M 10/0562* (2013.01); *H01M 10/0565* (2013.01); *C01P 2002/72* (2013.01); *C01P 2002/76* (2013.01); *C01P 2006/40* (2013.01); *H01M 2004/028* (2013.01)

(58) Field of Classification Search
CPC .......... H01M 10/052; H01M 10/0525; H01M 10/0565; H01M 10/0562
See application file for complete search history.

(56) References Cited

U.S. PATENT DOCUMENTS

| | | | | |
|---|---|---|---|---|
| 6,872,491 | B2 * | 3/2005 | Kanai | H01M 4/40 |
| | | | | 429/221 |
| 7,429,434 | B2 * | 9/2008 | Mihara | C01B 25/45 |
| | | | | 252/182.1 |
| 8,741,484 | B2 | 6/2014 | Karthikeyan et al. | |
| 9,178,249 | B2 | 11/2015 | Amine et al. | |
| 2002/0022183 | A1 | 2/2002 | Ogawa et al. | |
| 2002/0055042 | A1 * | 5/2002 | Kweon | C01G 53/44 |
| | | | | 429/223 |
| 2004/0202938 | A1 | 10/2004 | Noguchi et al. | |
| 2004/0229123 | A1 | 11/2004 | Takahashi et al. | |
| 2005/0084757 | A1 | 4/2005 | Kweon et al. | |
| 2009/0136854 | A1 | 5/2009 | Nakura | |
| 2009/0202892 | A1 | 8/2009 | Inagaki et al. | |
| 2010/0086854 | A1 | 4/2010 | Kumar et al. | |
| 2011/0247321 | A1 * | 10/2011 | Streeter | A61F 2/7843 |
| | | | | 60/327 |
| 2011/0294018 | A1 | 12/2011 | Amine et al. | |
| 2013/0136987 | A1 | 5/2013 | Uehara et al. | |
| 2013/0209871 | A1 | 8/2013 | Kato et al. | |
| 2013/0266868 | A1 | 10/2013 | Sun et al. | |
| 2014/0099549 | A1 | 4/2014 | Ceder et al. | |
| 2014/0127583 | A1 | 5/2014 | Han et al. | |
| 2014/0162127 | A1 | 6/2014 | Kim et al. | |
| 2014/0205913 | A1 | 7/2014 | Park et al. | |
| 2014/0272607 | A1 | 9/2014 | Amine et al. | |
| 2015/0010819 | A1 | 1/2015 | Lee et al. | |
| 2015/0090924 | A1 * | 4/2015 | Lee | H01M 4/505 |
| | | | | 252/182.1 |
| 2015/0093646 | A1 * | 4/2015 | Kawada | C01B 11/20 |
| | | | | 429/223 |
| 2015/0214550 | A1 | 7/2015 | Song et al. | |
| 2015/0228970 | A1 | 8/2015 | Song et al. | |
| 2015/0380768 | A1 | 12/2015 | Mizuno et al. | |
| 2016/0013517 | A1 | 1/2016 | Nakazawa et al. | |
| 2016/0049640 | A1 | 2/2016 | Takeuchi et al. | |
| 2016/0372747 | A1 | 12/2016 | Rolff et al. | |
| 2017/0005332 | A1 | 1/2017 | Chen et al. | |
| 2017/0207444 | A1 | 7/2017 | Yanagihara et al. | |
| 2019/0088940 | A1 * | 3/2019 | Ceder | H01M 4/485 |

FOREIGN PATENT DOCUMENTS

| | | |
|---|---|---|
| JP | H01-209663 A | 8/1989 |
| JP | 7-037617 | 2/1995 |
| JP | H09-330720 A | 12/1997 |
| JP | H10-294100 A | 11/1998 |
| JP | H10-302768 A | 11/1998 |
| JP | H10-326621 A | 12/1998 |
| JP | 11-339800 | 12/1999 |
| JP | H11-345615 A | 12/1999 |
| JP | 2000-012031 A | 1/2000 |
| JP | 2000-260433 A | 9/2000 |
| JP | 2001-516492 A | 9/2001 |
| JP | 2002-015776 A | 1/2002 |
| JP | 2003-229130 | 8/2003 |
| JP | 3578066 B2 | 10/2004 |
| JP | 2004-311408 A | 11/2004 |
| JP | 2004-349132 A | 12/2004 |
| JP | 2005-063953 A | 3/2005 |
| JP | 2006-261127 A | 9/2006 |
| JP | 2006-278341 A | 10/2006 |
| JP | 2007-018874 A | 1/2007 |
| JP | 2008-124038 A | 5/2008 |
| JP | 2009-187834 A | 8/2009 |
| JP | 2011-018656 A | 1/2011 |
| JP | 2012-014851 A | 1/2012 |
| JP | 2012-038564 A | 2/2012 |
| JP | 2012-156046 A | 8/2012 |
| JP | 2013-222612 A | 10/2013 |
| JP | 2014-022191 A | 2/2014 |
| JP | 2014-116308 A | 6/2014 |
| JP | 2015-022958 | 2/2015 |
| JP | 2015-069754 A | 4/2015 |
| JP | 2015-111551 A | 6/2015 |
| JP | 2015-118892 A | 6/2015 |
| JP | 2015-128023 | 7/2015 |
| JP | 2015-159109 A | 9/2015 |
| JP | 2016-033902 A | 3/2016 |
| WO | 1997/044842 A1 | 11/1997 |
| WO | 2012/014846 | 2/2012 |
| WO | 2012/086602 A1 | 6/2012 |
| WO | 2012/176267 A1 | 12/2012 |
| WO | 2014/126256 A1 | 8/2014 |
| WO | 2014/156153 | 10/2014 |
| WO | 2014/157591 A1 | 10/2014 |

OTHER PUBLICATIONS

International Search Report of PCT application No. PCT/JP2017/027997 dated Sep. 26, 2017.
ICSD Details on Search Result for Li2 (Mn O3), printed on Feb. 4, 2020.
Coban, Hüseyin çan Coban, "Metal Oxide (SnO2) Modified LiNi0.8Co0.2O2 Cathode Material for Lithium ION Batteries," M.Sc. Thesis, Department of Nano Science and Nano Engineering, Nano Science and Nano Engineering Programme, Istanbul Technical University Graduate School of Science Engineering and Technology. May 2014.
The Extended European Search Report dated Jun. 1, 2018 for the related European Patent Application No. 16827416.5.
International Search Report of PCT application No. PCT/JP2016/003215 dated Sep. 20, 2016.
International Search Report of PCT application No. PCT/JP2016/003954 dated Dec. 6, 2016.
International Search Report of PCT application No. PCT/JP2016/003949 dated Nov. 29, 2016.
International Search Report of PCT application No. PCT/JP2016/003955 dated Dec. 6, 2016.
International Search Report of PCT application No. PCT/JP2016/003948 dated Nov. 29, 2016.
International Search Report of PCT application No. PCT/JP2016/003952 dated Nov. 1, 2016.
International Search Report of PCT application No. PCT/JP2016/003953 dated Dec. 6, 2016.
International Search Report of PCT application No. PCT/JP2016/003951 dated Nov. 1, 2016.

(56) References Cited

OTHER PUBLICATIONS

International Search Report of PCT application No. PCT/JP2016/003950 dated Nov. 29, 2016.

International Search Report of PCT application No. PCT/JP2017/026210 dated Oct. 17, 2017.

M. Holzapfel et al., "Lithium-Ion Conductors of the System LiCo1-xFexO2, Preparation and Structural Investigation," Journal of Solid State Chemistry, 2001, 156, pp. 470-479.

S. Muhammad et al., "Deciphering the thermal behavior of lithium rich cathode material by in situ X-ray diffraction technique," Journal of Power Sources, 2015, 285, pp. 156-160.

International Search Report of PCT application No. PCT/JP2016/003956 dated Dec. 6, 2016.

Non-Final Office Action issued in U.S. Appl. No. 15/821,749, dated Jan. 16, 2020.

Notice of Allowance issued in U.S. Appl. No. 15/821,749, dated Apr. 15, 2020.

Non-Final Office Action issued in U.S. Appl. No. 15/821,745, dated Dec. 10, 2019.

Notice of Allowance issued in U.S. Appl. No. 15/821,745, dated Apr. 8, 2020.

Non-Final Office Action issued in U.S. Appl. No. 15/813,210, dated Jan. 2, 2020.

Non-Final Office Action issued in U.S. Appl. No. 15/813,204, dated Dec. 17, 2019.

Notice of Allowance issued in U.S. Appl. No. 15/813,204, dated Apr. 9, 2020.

Non-Final Office Action issued in U.S. Appl. No. 15/814,874, dated Jan. 2, 2020.

Non-Final Office Action issued in U.S. Appl. No. 15/811,685, dated Dec. 3, 2019.

Notice of Allowance issued in U.S. Appl. No. 15/811,685, dated Apr. 9, 2020.

Non-Final Office Action issued in U.S. Appl. No. 15/813,212, dated Dec. 31, 2019.

Non-Final Office Action issued in U.S. Appl. No. 15/811,683, dated Nov. 15, 2018.

Final Office Action issued in U.S. Appl. No. 15/811,683, dated Apr. 18, 2019.

Notice of Allowance issued in U.S. Appl. No. 15/811,683, dated Aug. 19, 2019.

Non-Final Office Action issued in U.S. Appl. No. 15/811,684, dated Dec. 5, 2019.

Final Office Action issued in U.S. Appl. No. 15/811,684, dated Mar. 13, 2020.

Notice of Allowance issued in U.S. Appl. No. 15/811,684, dated Apr. 8, 2020.

Non-Final Office Action issued in U.S. Appl. No. 15/838,360, dated Feb. 10, 2020.

Non-Final Office Action issued in U.S. Appl. No. 15/844,626, dated Mar. 18, 2020.

Non-Final Office Action issued in U.S. Appl. No. 15/813,218, dated Jan. 16, 2020.

Non-Final Office Action issued in U.S. Appl. No. 15/702,632, dated Jun. 17, 2019.

Non-Final Office Action issued in U.S. Appl. No. 15/702,632, dated Nov. 26, 2019.

Final Office Action issued in U.S. Appl. No. 15/702,632, dated Aug. 23, 2019.

Non-Final Office Action issued in U.S. Appl. No. 15/838,360, dated Apr. 22, 2020.

Notice of Allowance issued in U.S. Appl. No. 15/702,632, dated Apr. 20, 2020.

Notice of Allowance issued in U.S. Appl. No. 15/813,210, dated Apr. 22, 2020.

Notice of Allowance issued in U.S. Appl. No. 15/813,218, dated May 4, 2020.

Notice of Allowance issued in U.S. Appl. No. 15/813,212, dated May 1, 2020.

Notice of Allowance issued in U.S. Appl. No. 15/814,874, dated May 1, 2020.

Shuhue Ren et al, Improved Voltage and Cycling for intercalation in High-Capacity Disordered Oxyfluonde Cathodes, Advanced Science, Jun. 12, 2015, vol. 2, Issue 10, 1500128.

English Translation of Chinese Search Report dated Jul. 13, 2020 for the related Chinese Patent Application No. 201680013989.7.

Lianqi Zhang et al, "Synthesis and electrochemistry of cubic rocksait Li-Ni-Ti-O compounds in the phase diagram of LiNiO2-LiTiO2-Li[Li1/3Ti2/3]O2." Journal of Power Sources, 185(2008), p. 534-p. 541.

Written Opinion for Japanese Patent Application No. 2017-50476, dated Sep. 1, 2020; with English translation.

* cited by examiner

POSITIVE ELECTRODE ACTIVE MATERIAL AND BATTERY USING POSITIVE ELECTRODE ACTIVE MATERIAL

BACKGROUND

1. Technical Field

The present disclosure relates to a positive electrode active material and a battery using positive electrode active material.

2. Description of the Related Art

Japanese Unexamined Patent Application Publication No. 7-037617 discloses a positive-electrode active material that has a crystal structure belonging to the space group R-3m and that is represented by the formula $Li_wM_xO_yX_z$ (M denotes Co, Ni, Mn, V, Fe, or Ti, X denotes at least one halogen element, and $0.2 \leq w \leq 2.5$, $0.8 \leq x \leq 1.25$, $1 \leq y \leq 2$, and $0 < z \leq 1$ are satisfied).

SUMMARY

One non-limiting and exemplary embodiment provides a high-capacity battery.

In one general aspect, the techniques disclosed here feature a positive-electrode active material, containing a compound represented by the following composition formula (1):

$$Li_xMe_yO_\alpha X_\beta \qquad (1)$$

where Me denotes one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er, X denotes two or more elements selected from the group consisting of F, Cl, Br, I, N, and S, and x, y, α, and β satisfy $0.75 \leq x \leq 2.25$, $0.75 \leq y \leq 1.50$, $1 \leq \alpha < 3$, and $0 < \beta \leq 2$, respectively. A crystal structure of the compound belongs to a space group Fm-3m.

The present disclosure can provide a high-capacity battery.

It should be noted that general or specific aspects of the present disclosure may be implemented as a positive-electrode active material, a battery, a method, or any combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
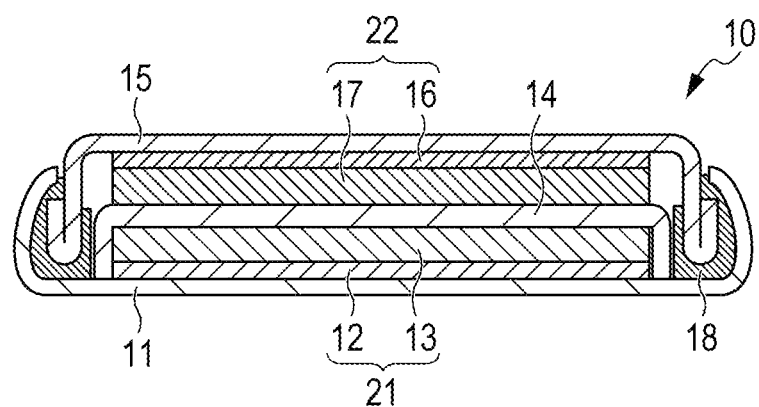
FIG. 1 is a schematic cross-sectional view of a battery according to a second embodiment.

Embodiments of the present disclosure will be described below.

First Embodiment

A positive-electrode active material for batteries according to a first embodiment contains a compound that has a crystal structure belonging to the space group Fm-3m and that is represented by the following composition formula (1):

$$Li_xMe_yO_\alpha X_\beta \qquad (1)$$

where Me denotes one or two or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er.

X denotes two or more elements selected from the group consisting of F, Cl, Br, I, N, and S.

The compound satisfies $0.75 \leq x \leq 2.25$, $0.75 \leq y \leq 1.50$, $1 \leq \alpha < 3$, and $0 < \beta \leq 2$ in the composition formula (1).

Such an embodiment can provide a high-capacity battery.

For example, a lithium-ion battery including a positive-electrode active material containing the compound has an oxidation-reduction potential of approximately 3.3 V (vs. Li/Li$^+$). The lithium-ion battery has an energy density of approximately 3400 Wh/L or more.

In the composition formula (1), X denotes two or more elements selected from the group consisting of F, Cl, Br, I, N, and S. The substitution of such an electronegative element for oxygen improves the discharge capacity or operating voltage. Substitution with an anion with a large ionic radius expands the crystal lattice and stabilizes the structure. Thus, the positive-electrode active material for batteries according to the first embodiment can be used to manufacture a high-capacity battery.

In the first embodiment, if X denotes two or more elements (for example, X' and X'') with a component ratio of "$X'_{\beta1}X''_{\beta2}$", then "$\beta=\beta1+\beta2$". For example, if X denotes two or more elements (F and Cl) with a component ratio of "$F_{0.4}Cl_{0.1}$", then "$\beta=0.4+0.1=0.5$".

In the composition formula (1) of the compound, x of less than 0.75 results in a decreased amount of available Li. This results in insufficient capacity.

In the composition formula (1) of the compound, x of more than 2.25 results in a decrease in an oxidation-reduction reaction of an available transition metal. This results in increased utilization of an oxidation-reduction reaction of oxygen. This destabilizes the crystal structure. This results in insufficient capacity.

In the composition formula (1) of the compound, y of less than 0.75 results in a decrease in an oxidation-reduction reaction of an available transition metal. This results in increased utilization of an oxidation-reduction reaction of oxygen. This destabilizes the crystal structure. This results in insufficient capacity.

In the composition formula (1) of the compound, y of greater than 1.50 results in a decreased amount of available Li. This results in insufficient capacity.

In the composition formula (1) of the compound, a of less than 1 results in a decrease in the amount of charge compensation due to oxidation-reduction of oxygen. This results in insufficient capacity.

In the composition formula (1) of the compound, a of 3 or more results in excess capacity due to oxidation-reduction of oxygen and results in destabilization of the structure upon Li deintercalation. This results in insufficient capacity.

In the composition formula (1) of the compound, β of 0 results in a decrease in cation-anion interaction due to the absence of the effects of electronegative X. This destabilizes the structure upon Li deintercalation. This results in insufficient capacity.

In the composition formula (1) of the compound, $\beta$ of more than 2 results in a decrease in electronic conductivity due to enhanced effects of electronegative X. This results in insufficient capacity.

In the composition formula (1) of the compound, $2.0 \le \alpha \le 2.8$ may be satisfied.

Such an embodiment can provide a higher-capacity battery.

In the composition formula (1) of the compound, $0.2 \le \beta \le 1.0$ may be satisfied.

Such an embodiment can provide a higher-capacity battery.

In the composition formula (1) of the compound, $2.0 \le \alpha/\beta \le 14.0$ may be satisfied.

Such an embodiment can provide a higher-capacity battery.

$\alpha/\beta$ of 2.0 or more results in a smaller decrease in the amount of charge compensation due to oxidation-reduction of oxygen. This can prevent excessively strong effects of electronegative X and reduce the decrease in electronic conductivity. This results in sufficient capacity.

$\alpha/\beta$ of 14.0 or less results in suppression of excess capacity due to oxidation-reduction of oxygen and results in suppression of destabilization of the structure upon Li deintercalation. This can prevent an excessive decrease in the effects of electronegative X and reduce the decrease in cation-anion interaction. This can suppress the destabilization of the structure upon Li deintercalation. This results in sufficient capacity.

In the composition formula (1) of the compound, $2.0 \le \alpha/\beta \le 5.0$ may be satisfied.

Such a structure is not destabilized upon Li deintercalation and can provide a higher-capacity battery.

In the composition formula (1) of the compound, $0.5 \le x/y \le 3.0$ may be satisfied.

Such an embodiment can provide a higher-capacity battery.

$x/y$ of 0.5 or more results in an increased amount of available Li. This can suppress the blockage of the Li diffusion path.

$x/y$ of 3.0 or less results in an increased oxidation-reduction reaction of an available transition metal. This reduces utilization of an oxidation-reduction reaction of oxygen. This stabilizes the crystal structure upon Li deintercalation during charging and increases Li intercalation efficiency during discharging.

In the composition formula (1) of the compound, $1.17 \le x/y \le 1.75$ may be satisfied.

Such an embodiment can provide a higher-capacity battery.

In the positive-electrode active material for batteries according to the first embodiment, Li and Me in a compound represented by the composition formula (1) are probably located at the same site.

Thus, when $1.0 < x/y$ is satisfied, a compound represented by the composition formula (1) can intercalate and deintercalate more Li per Me atom than a known positive-electrode active material, for example, $LiCoO_2$.

Thus, when $1.0 < x/y$ is satisfied, a compound represented by the composition formula (1) is suitable for a high-capacity lithium-ion battery.

However, for example, a layered structure specified by the space group R-3m cannot hold the layers and disintegrates upon abstraction of much Li.

By contrast, a cubic rock-salt-type crystal structure specified by the space group Fm-3m, such as the positive-electrode active material for batteries according to the first embodiment, can stably maintain the structure without disintegration, even after abstraction of much Li. In a cubic rock-salt-type crystal structure specified by the space group Fm-3m, elements with different ionic radii may mix together easily. For these reasons, a high-capacity battery can be achieved.

In the composition formula (1) of the compound, $0.67 \le (x+y)/(\alpha+\beta) \le 1.15$ may be satisfied.

Such an embodiment can provide a higher-capacity battery.

$(x+y)/(\alpha+\beta)$ of 0.67 or more results in suppression of phase separation during synthesis and results in a decrease in the amount of impurities. This results in sufficient capacity.

$(x+y)/(\alpha+\beta)$ of 1.15 or less results in suppression of an anion-deficient structure, suppression of destabilization of the crystal structure upon Li deintercalation during charging, and increased Li intercalation efficiency during discharging. This results in insufficient capacity.

$(x+y)/(\alpha+13)$ of less than 1 results in the formation of a cation-deficient structure and more Li diffusion paths, which results in a high-capacity battery.

In the composition formula (1) of the compound, $0.67 \le (x+y)/(\alpha+13) \le 0.95$ may be satisfied.

Such an embodiment can provide a higher-capacity battery.

In other words, in the composition formula (1) of the compound, if $\alpha+13=3$, then $2.0 \le x+y \le 3.45$ may be satisfied.

Such an embodiment can provide a higher-capacity battery.

In the composition formula (1) of the compound, if $\alpha+\beta=3$, $2.0 \le x+y \le 2.85$ may be satisfied.

Such an embodiment can provide a higher-capacity battery.

In the composition formula (1) of the compound, Me may include Mn.

Such an embodiment can provide a higher-capacity battery.

Mn, which has a greater orbital overlap with oxygen than Co or Ni, probably increases the capacity due to an oxidation-reduction reaction of oxygen.

In the composition formula (1) of the compound, X may include F. More specifically, X may include F and one or two or more elements selected from the group consisting of Cl, Br, I, N, and S.

Such an embodiment can provide a higher-capacity battery.

Due to its smaller ionic radius and higher electronegativity than the other elements, F can increase the battery capacity.

The positive-electrode active material for batteries according to the first embodiment may contain the compound as a main component.

Such an embodiment can provide a higher-capacity battery.

The term "main component", as used herein, means that the compound constitutes, for example, 90% or more by weight of the positive-electrode active material for batteries according to the first embodiment.

In addition to the compound as a main component, the positive-electrode active material for batteries according to the first embodiment may contain incidental impurities, or starting materials for the synthesis of the compound, by-products, and degradation products.

<Method for Producing Compound>

An exemplary method for producing the compound of the positive-electrode active material for batteries according to the first embodiment will be described below.

A compound represented by the composition formula (1) can be produced by the following method, for example.

A raw material containing Li, a raw material containing X, and a raw material containing Me are prepared.

Examples of the raw material containing Li include oxides, such as $Li_2O$ and $Li_2O_2$, salts, such as LiX, $Li_2CO_3$, and LiOH, and lithium composite transition metal oxides, such as $LiMeO_2$ and $LiMe_2O_4$.

Examples of the raw material containing X include lithium halides, transition metal halides, transition metal sulfides, and transition metal nitrides.

Examples of the raw material containing Me include oxides in various oxidation states, such as $Me_2O_3$, salts, such as $MeCO_3$ and $MeNO_3$, hydroxides, such as $Me(OH)_2$ and MeOOH, and lithium composite transition metal oxides, such as $LiMeO_2$ and $LiMe_2O_4$.

In the case that Me is Mn, examples of the raw material containing Mn include manganese oxides in various oxidation states, such as $Mn_2O_3$, salts, such as $MnCO_3$ and $MnNO_3$, hydroxides, such as $Mn(OH)_2$ and MnOOH, and lithium composite transition metal oxides, such as $LiMnO_2$ and $LiMn_2O_4$.

These raw materials are weighed at the mole ratio of the composition formula (1).

The variables "x, y, α, and β" in the composition formula (1) can be altered in the ranges described for the composition formula (1).

The weighed raw materials are mixed, for example, by a dry process or a wet process and are allowed to react mechanochemically for 10 hours or more to produce a compound represented by the composition formula (1). For example, a mixing apparatus, such as a ball mill, may be used.

The raw materials and the conditions for mixing a mixture of the raw materials can be adjusted to produce a compound substantially represented by the composition formula (1).

The use of a lithium transition metal composite oxide as a precursor can decrease the energy for mixing elements. Thus, a compound represented by the composition formula (1) can be produced with higher purity.

The composition of a compound represented by the composition formula (1) thus produced can be determined by ICP spectroscopy and an inert gas fusion-infrared absorption method, for example.

A compound represented by the composition formula (1) can be identified by determining the space group of the crystal structure by powder X-ray analysis.

Thus, a method for producing a positive-electrode active material for batteries according to one aspect of the first embodiment includes (a) a step of preparing the raw materials and (b) a step of mechanochemically reacting the raw materials to produce the positive-electrode active material for batteries.

The step (a) may include a step of mixing raw materials containing Li, X, and Me at a Li/Me mole ratio in the range of 1.31 to 2.33 to prepare a raw material mixture.

The step (a) may include a step of producing a raw material, a lithium transition metal composite oxide, by a known method.

The step (a) may include a step of mixing the raw materials at a Li/Me mole ratio in the range of 1.7 to 2.0 to prepare a raw material mixture.

The step (b) may include a step of mechanochemically reacting the raw materials in a ball mill.

Thus, a compound represented by the composition formula (1) may be synthesized by mechanochemically reacting a precursor (for example, LiCl, $Li_2O$, a transition metal oxide, a lithium composite transition metal, etc.) in a planetary ball mill.

The mixing ratio of the precursor can be adjusted to introduce more Li atoms.

When the precursor is reacted by a solid phase method, the precursor is decomposed into more stable compounds.

Thus, a compound that has a crystal structure belonging to the space group Fm-3m and is represented by the composition formula (1) cannot be produced by a method for reacting the precursor by a solid phase method.

Second Embodiment

A second embodiment will be described below. The contents described in the first embodiment are appropriately omitted to avoid overlap.

A battery of the second embodiment includes a positive electrode containing the positive-electrode active material for batteries according to the first embodiment, a negative electrode, and an electrolyte.

Such an embodiment can provide a high-capacity battery.

The battery according to the second embodiment may be a lithium-ion secondary battery, a non-aqueous electrolyte secondary battery, or an all-solid-state battery, for example.

In the battery according to the second embodiment, the negative electrode may contain a negative-electrode active material that stores and releases lithium, for example.

In the battery according to the second embodiment, for example, the electrolyte may be a non-aqueous electrolyte (for example, a non-aqueous electrolyte solution).

In the battery according to the second embodiment, the electrolyte may be a solid electrolyte, for example.

FIG. 1 is a schematic cross-sectional view of a battery 10 according to the second embodiment.

As illustrated in FIG. 1, the battery 10 includes a positive electrode 21, a negative electrode 22, a separator 14, a case 11, a sealing plate 15, and a gasket 18.

The separator 14 is disposed between the positive electrode 21 and the negative electrode 22.

The positive electrode 21, the negative electrode 22, and the separator 14 are impregnated with a non-aqueous electrolyte (for example, a non-aqueous electrolyte solution), for example.

The positive electrode 21, the negative electrode 22, and the separator 14 constitute an electrode group.

The electrode group is housed in the case 11.

The case 11 is sealed with the gasket 18 and the sealing plate 15.

The positive electrode 21 includes a positive-electrode current collector 12 and a positive-electrode active material layer 13 disposed on the positive-electrode current collector 12.

The positive-electrode current collector 12 is formed of a metallic material (aluminum, stainless steel, an aluminum alloy, etc.), for example.

The positive-electrode current collector 12 may be omitted, and the case 11 may be used as a positive-electrode current collector.

The positive-electrode active material layer 13 contains the positive-electrode active material for batteries according to the first embodiment.

If necessary, the positive-electrode active material layer 13 may contain an additive agent (an electrically conductive agent, an ionic conduction aid, a binder, etc.).

The negative electrode 22 includes a negative-electrode current collector 16 and a negative-electrode active material layer 17 disposed on the negative-electrode current collector 16.

The negative-electrode current collector 16 is formed of a metallic material (aluminum, stainless steel, an aluminum alloy, etc.), for example.

The negative-electrode current collector 16 may be omitted, and the sealing plate 15 may be used as a negative-electrode current collector.

The negative-electrode active material layer 17 contains a negative-electrode active material.

If necessary, the negative-electrode active material layer 17 may contain an additive agent (an electrically conductive agent, an ionic conduction aid, a binder, etc.).

The negative-electrode active material may be a metallic material, carbon material, oxide, nitride, tin compound, or silicon compound.

The metallic material may be a single metal. Alternatively, the metallic material may be an alloy. Examples of the metallic material include lithium metal and lithium alloys.

Examples of the carbon material include natural graphite, coke, carbon under graphitization, carbon fiber, spherical carbon, artificial graphite, and amorphous carbon.

From the perspective of capacity density, silicon (Si), tin (Sn), silicon compounds, and tin compounds can be used. Silicon compounds and tin compounds may be alloys and solid solutions.

Examples of the silicon compounds include $SiO_x$ (wherein $0.05<x<1.95$). Compounds (for example, alloys and solid solutions) produced by substituting another element for part of silicon of $SiO_x$ may also be used. The other element may be at least one selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (wherein $0<x<2$), $SnO_2$, and $SnSiO_3$. A tin compound selected from these compounds may be used alone. Alternatively, two or more tin compounds selected from these compounds may be used in combination.

The negative-electrode active material may have any shape. The negative-electrode active material may have a known shape (particulate, fibrous, etc.).

The negative-electrode active material layer 17 may be filled with (that is, store) lithium by any method. More specifically, the method may be (a) a method of depositing lithium on the negative-electrode active material layer 17 by a gas phase method, such as a vacuum evaporation method, or (b) a method of heating a lithium metal foil in contact with the negative-electrode active material layer 17. In these methods, lithium can be diffused into the negative-electrode active material layer 17 by heat. Alternatively, lithium may be electrochemically stored on the negative-electrode active material layer 17. More specifically, a battery is assembled from the negative electrode 22 free of lithium and the positive electrode 21 including a lithium metal foil. Subsequently, the battery is charged to store lithium on the negative electrode 22.

Examples of the binder for the positive electrode 21 and the negative electrode 22 include poly(vinylidene difluoride), polytetrafluoroethylene, polyethylene, polypropylene, aramid resin, polyimide, polyimide, polyamideimide, polyacrylonitrile, poly(acrylic acid), poly(methyl acrylate), poly (ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, hexafluoropolypropylene, styrene-butadiene rubber, and carboxymethylcellulose. Other examples of the binder include copolymers of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. The binder may also be a mixture of two or more materials selected from these materials.

Examples of the electrically conductive agent for the positive electrode 21 and the negative electrode 22 include graphite, carbon black, electrically conductive fiber, graphite fluoride, metal powders, electrically conductive whiskers, electrically conductive metal oxides, and electrically conductive organic materials. Examples of the graphite include natural graphite and artificial graphite. Examples of the carbon black include acetylene black, ketjen black (registered trademark), channel black, furnace black, lampblack, and thermal black. Examples of the metal powders include aluminum powders. Examples of the electrically conductive whiskers include zinc oxide whiskers and potassium titanate whiskers. Examples of the electrically conductive metal oxides include titanium oxide. Examples of the electrically conductive organic materials include phenylene derivatives.

The separator 14 may be formed of a material that has high ion permeability and sufficient mechanical strength. Examples of such a material include microporous thin films, woven fabrics, and nonwoven fabrics. More specifically, it is desirable that the separator 14 be formed of a polyolefin, such as polypropylene or polyethylene. The separator 14 formed of a polyolefin has not only good durability but also a shutdown function in case of excessive heating. The separator 14 has a thickness in the range of 10 to 300 μm (or 10 to 40 μm), for example. The separator 14 may be a monolayer film formed of one material. Alternatively, the separator 14 may be a composite film (or multilayer film) formed of two or more materials. The separator 14 has a porosity in the range of 30% to 70% (or 35% to 60%), for example. The term "porosity", as used herein, refers to the volume ratio of pores to the separator 14. The "porosity" is measured by a mercury intrusion method, for example.

The non-aqueous electrolyte solution contains a non-aqueous solvent and a lithium salt dissolved in the non-aqueous solvent.

Examples of the non-aqueous solvent include cyclic carbonate solvents, chain carbonate solvents, cyclic ether solvents, chain ether solvents, cyclic ester solvents, chain ester solvents, and fluorinated solvents.

Examples of the cyclic carbonate solvents include ethylene carbonate, propylene carbonate, and butylene carbonate.

Examples of the chain carbonate solvents include dimethyl carbonate, ethyl methyl carbonate, and diethyl carbonate.

Examples of the cyclic ether solvents include tetrahydrofuran, 1,4-dioxane, and 1,3-dioxolane.

Examples of the chain ether solvents include 1,2-dimethoxyethane and 1,2-diethoxyethane.

Examples of the cyclic ester solvent include γ-butyrolactone.

Examples of the chain ester solvents include methyl acetate.

Examples of the fluorinated solvents include fluoroethylene carbonate, methyl fluoropropionate, fluorobenzene, fluoroethyl methyl carbonate, and fluorodimethylene carbonate.

The non-aqueous solvent may be one non-aqueous solvent selected from these. Alternatively, the non-aqueous solvent may be a combination of two or more non-aqueous solvents selected from these.

The non-aqueous electrolyte solution may contain at least one fluorinated solvent selected from the group consisting of fluoroethylene carbonate, methyl fluoropropionate, fluorobenzene, fluoroethyl methyl carbonate, and fluorodimethylene carbonate.

These fluorinated solvents in the non-aqueous electrolyte solution improve the oxidation resistance of the non-aqueous electrolyte solution.

Consequently, even when the battery 10 is charged at a high voltage, the battery 10 can operate stably.

In the battery according to the second embodiment, the electrolyte may be a solid electrolyte.

Examples of the solid electrolyte include organic polymer solid electrolytes, oxide solid electrolytes, and sulfide solid electrolytes.

Examples of the organic polymer solid electrolytes include compounds of a polymer and a lithium salt.

The polymer may have an ethylene oxide structure. The ethylene oxide structure can increase the lithium salt content and ionic conductivity.

Examples of the oxide solid electrolytes include NASICON-type solid electrolytes, exemplified by $LiTi_2(PO_4)_3$ and element substitution products thereof, $(LaLi)TiO_3$ perovskite solid electrolytes, LISICON-type solid electrolytes, exemplified by $Li_{14}ZnGe_4O_{16}$, $Li_4SiO_4$, $LiGeO_4$, and element substitution products thereof, garnet solid electrolytes, exemplified by $Li_7La_3Zr_2O_{12}$ and element substitution products thereof, $Li_3N$ and H substitution products thereof, and $Li_3PO_4$ and N substitution products thereof.

Examples of the sulfide solid electrolytes include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. LiX (X: F, Cl, Br, or I), $MO_y$, or $Li_xMO_y$ (M: P, Si, Ge, B, Al, Ga, or In) (x, y: natural number) may be added to the sulfide solid electrolytes.

Among these, in particular, sulfide solid electrolytes have high formability and ionic conductivity. Thus, the use of sulfide solid electrolytes as solid electrolytes can achieve a battery with a higher energy density.

Among sulfide solid electrolytes, $Li_2S$—$P_2S_5$ has high electrochemical stability and higher ionic conductivity. Thus, the use of $Li_2SP_2S_5$ as a solid electrolyte can achieve a battery with a higher energy density.

A solid electrolyte layer may contain the non-aqueous electrolyte solution.

A non-aqueous electrolyte solution in a solid electrolyte layer facilitates lithium ion transfer between an active material and the solid electrolyte. Consequently, a battery with a higher energy density can be achieved.

In addition to a solid electrolyte, a solid electrolyte layer may contain a gel electrolyte or an ionic liquid.

The gel electrolyte may be a polymer material containing a non-aqueous electrolyte solution. The polymer material may be poly(ethylene oxide), polyacrylonitrile, poly(vinylidene difluoride), poly(methyl methacrylate), or a polymer having an ethylene oxide bond.

A cation in the ionic liquid may be an aliphatic chain quaternary salt, such as tetraalkylammonium or tetraalkylphosphonium, an alicyclic ammonium, such as pyrrolidinium, morpholinium, imidazolinium tetrahydropyrimidinium, piperazinium, or piperidinium, or a nitrogen-containing heterocyclic aromatic cation, such as pyridinium or imidazolium. An anion in the ionic liquid may be $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $NSO_2CF_3)(SO_2C_4F_9)^-$, or $C(SO_2CF_3)_3^-$. The ionic liquid may contain a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. The lithium salt may be one lithium salt selected from these. Alternatively, the lithium salt may be a mixture of two or more lithium salts selected from these. The concentration of the lithium salt ranges from 0.5 to 2 mol/l, for example.

The battery according to the second embodiment may be of various types, such as a coin type, a cylindrical type, a square or rectangular type, a sheet type, a button type, a flat type, or a layered type.

EXAMPLES

Example 1

[Production of Positive-Electrode Active Material]

$MnCl_2$, $LiMnO_2$, $MnO_2$, $Li_2O$, and LiF were weighed at a mole ratio of $MnCl_2:LiMnO_2:MnO_2:Li_2O:LiF=1:12:11:4:8$.

The raw materials, together with a proper amount of φ3-mm zirconia balls, were put in a 45-cc zirconia container, which was then sealed in an argon glove box.

It was removed from the argon glove box and was treated in a planetary ball mill at 600 rpm for 30 hours.

The resulting compound was subjected to X-ray powder diffraction measurement.

Figure 2:
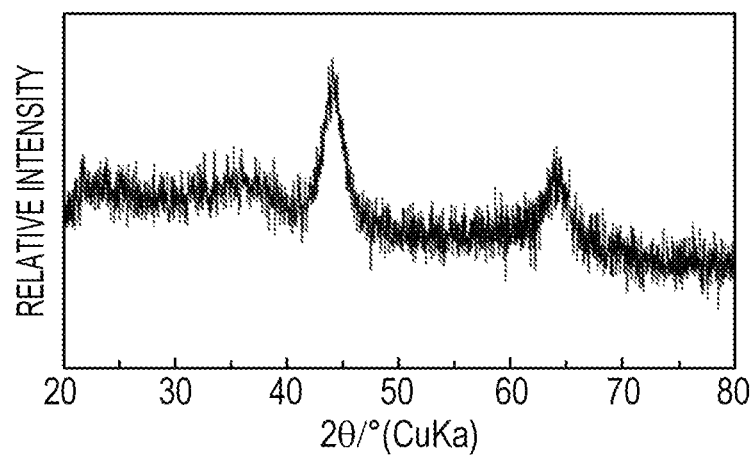
FIG. 2 is an X-ray powder diffraction chart of a positive-electrode active material according to Example 1.

FIG. 2 shows the results.

The space group of the compound was Fm-3m.

The composition of the compound was determined by ICP spectroscopy and inert gas fusion-infrared absorption.

The compound had a composition of $Li_{1.4}Mn_{1.2}O_{2.5}F_{0.4}Cl_{0.1}$.

[Production of Battery]

Next, 70 parts by mass of the compound, 20 parts by mass of an electrically conductive agent, 10 parts by mass of poly(vinylidene difluoride) (PVDF), and a proper amount of 2-methylpyrrolidone (NMP) were mixed to prepare a positive-electrode mixture slurry.

The positive-electrode mixture slurry was applied to one side of a positive-electrode current collector formed of aluminum foil 20 μm in thickness.

The positive-electrode mixture slurry was dried and rolled to form a positive-electrode plate with a positive-electrode active material layer. The positive-electrode plate had a thickness of 60 μm.

A circular positive electrode 12.5 mm in diameter was punched out from the positive-electrode plate.

A circular negative electrode 14.0 mm in diameter was punched out from lithium metal foil 300 μm in thickness.

Fluoroethylene carbonate (FEC), ethylene carbonate (EC), and ethyl methyl carbonate (EMC) were mixed at a volume ratio of 1:1:6 to prepare a non-aqueous solvent.

$LiPF_6$ was dissolved at a concentration of 1.0 mol/l in the non-aqueous solvent to prepare a non-aqueous electrolyte solution.

A separator (manufactured by Celgard, LLC., product number 2320, 25 μm in thickness) was impregnated with the non-aqueous electrolyte solution.

Celgard (registered trademark) 2320 is a 3-layer separator composed of a polypropylene layer, a polyethylene layer, and a polypropylene layer.

A CR2032 coin-type battery was assembled from the positive electrode, the negative electrode, and the separator in a dry box maintained at a dew point of −50° C.

Examples 2 to 16

The type of Me, the type of X, and the element ratio were changed from those described in Example 1.

Table 1 lists the compositions of the positive-electrode active materials according to Examples 2 to 16.

Except for these, the positive-electrode active materials according to Examples 2 to 16 were synthesized in the same manner as in Example 1.

Coin-type batteries were assembled in the same manner as in Example 1 by using the positive-electrode active materials according to Examples 2 to 16.

Comparative Example 1

$MnCl_2$, $LiMnO_2$, $MnO_2$, $Li_2O$, and $LiF$ were weighed at a mole ratio of $MnCl_2:LiMnO_2:MnO_2:Li_2O:LiF=1:12:11:4:8$.

The raw material mixture was fired in an inert gas atmosphere at 800° C. Thus, particles of a lithium manganese composite compound were formed.

The space group of the lithium manganese composite compound particles thus produced was R-3m.

A coin-type battery was assembled in the same manner as in Example 1 by using the lithium manganese composite compound particles as a positive-electrode active material.

Comparative Example 2

Lithium cobalt oxide ($LiCoO_2$) was produced by a known method.

The space group of the lithium cobalt oxide was R-3m.

A coin-type battery was assembled in the same manner as in Example 1 by using the lithium cobalt oxide as a positive-electrode active material.

Comparative Example 3

Particles of an X-free lithium manganese composite compound ($LiMn_{0.8}O_2$) were prepared in the same manner as in the example.

The space group of the lithium manganese composite compound particles was Fm-3m.

A coin-type battery was assembled in the same manner as in Example 1 by using the lithium manganese composite compound particles as a positive-electrode active material.

<Evaluation of Battery Performance>

The electric current density on the positive electrode was set at 0.5 $mA/cm^2$, and the battery according to Example 1 was charged to a voltage of 5.2 V.

Subsequently, the discharge cut-off voltage was set at 1.5 V, and the battery according to Example 1 was discharged at an electric current density of 0.5 $mA/cm^2$.

The initial energy density was 4800 Wh/L.

The electric current density on the positive electrode was set at 0.5 $mA/cm^2$, and the battery according to Comparative Example 1 was charged to a voltage of 5.2 V.

Subsequently, the discharge cut-off voltage was set at 1.5 V, and the battery according to Comparative Example 1 was discharged at an electric current density of 0.5 $mA/cm^2$.

The battery according to Comparative Example 1 had an initial energy density of 2000 Wh/L.

The electric current density on the positive electrode was set at 0.5 $mA/cm^2$, and the battery according to Comparative Example 2 was charged to a voltage of 4.3 V.

Subsequently, the discharge cut-off voltage was set at 2.5 V, and the battery according to Comparative Example 2 was discharged at an electric current density of 0.5 $mA/cm^2$.

The battery according to Comparative Example 2 had an initial energy density of 2500 Wh/L.

The capacities of the coin-type batteries according to Examples 2 to 16 and Comparative Example 3 were measured in the same manner as in Example 1.

Table 1 shows the results.

TABLE 1

|  | Composition | x/y | α/β | (x + y)/(α + β) | Space group | Energy density (Wh/L) |
|---|---|---|---|---|---|---|
| Example 1 | $Li_{1.4}Mn_{1.2}O_{2.5}F_{0.4}Cl_{0.1}$ | 1.17 | 5.0 | 0.87 | Fm-3m | 4800 |
| Example 2 | $Li_{1.4}Mn_{1.2}O_{2.5}F_{0.4}Br_{0.1}$ | 1.17 | 5.0 | 0.87 | Fm-3m | 4200 |
| Example 3 | $Li_{1.4}Mn_{1.2}O_{2.5}S_{0.4}F_{0.1}$ | 1.17 | 5.0 | 0.87 | Fm-3m | 4000 |
| Example 4 | $Li_{1.4}Mn_{1.2}O_{2.5}N_{0.2}F_{0.3}$ | 1.17 | 5.0 | 0.87 | Fm-3m | 4020 |
| Example 5 | $Li_{1.4}Mn_{1.2}O_{2.5}S_{0.4}I_{0.1}$ | 1.17 | 5.0 | 0.87 | Fm-3m | 3700 |
| Example 6 | $Li_{1.2}Co_{0.8}O_{2.5}F_{0.4}Cl_{0.1}$ | 1.50 | 5.0 | 0.67 | Fm-3m | 4100 |
| Example 7 | $Li_{1.4}Ni_{0.2}Mn_{0.6}O_{2.5}F_{0.4}Cl_{0.1}$ | 1.75 | 5.0 | 0.73 | Fm-3m | 4520 |
| Example 8 | $Li_{1.4}Co_{0.2}Mn_{0.6}O_{2.5}F_{0.4}Cl_{0.1}$ | 1.75 | 5.0 | 0.73 | Fm-3m | 4210 |
| Example 9 | $Li_{1.4}Mn_{1.2}O_{2.8}F_{0.1}Cl_{0.1}$ | 1.17 | 14.0 | 0.87 | Fm-3m | 4090 |
| Example 10 | $Li_{1.4}Mn_{1.2}O_{2.0}F_{0.7}Cl_{0.3}$ | 1.17 | 2.0 | 0.87 | Fm-3m | 4300 |
| Example 11 | $Li_{1.5}Mn_{1.5}O_{2.5}F_{0.4}Cl_{0.1}$ | 1.00 | 5.0 | 1.00 | Fm-3m | 3400 |
| Example 12 | $Li_{2.25}Mn_{0.75}O_{2.5}F_{0.4}Cl_{0.1}$ | 3.00 | 5.0 | 1.00 | Fm-3m | 3740 |
| Example 13 | $Li_{0.75}Mn_{1.5}O_{2.5}F_{0.4}Cl_{0.1}$ | 0.50 | 5.0 | 0.75 | Fm-3m | 3600 |
| Example 14 | $Li_{2.1}Mn_{1.35}O_{2.5}F_{0.4}Cl_{0.1}$ | 1.56 | 5.0 | 1.15 | Fm-3m | 3890 |
| Example 15 | $Li_{2.0}Mn_{1.0}O_{2.5}F_{0.4}Cl_{0.1}$ | 2.00 | 5.0 | 1.00 | Fm-3m | 3890 |
| Example 16 | $Li_{1.71}Mn_{1.14}O_{2.5}F_{0.4}Cl_{0.1}$ | 1.50 | 5.0 | 0.95 | Fm-3m | 4140 |
| Comparative example 1 | $Li_{1.4}Mn_{1.2}O_{2.5}F_{0.4}Cl_{0.1}$ | 1.17 | 5.0 | 0.87 | R-3m | 2000 |
| Comparative example 2 | $LiCoO_2$ | 1.00 | — | 1.00 | R-3m | 2500 |
| Comparative example 3 | $LiMn_{0.8}O_2$ | 1.25 | — | 0.9 | Fm-3m | 3500 |

Table 1 shows that the batteries according to Examples 1 to 16 have an initial energy density in the range of 3400 to 4800 Wh/L.

Thus, the batteries according to Examples 1 to 16 have a higher initial energy density than the batteries according to Comparative Examples 1 and 2.

This is probably because Examples 1 to 16 belong to the space group Fm-3m, could maintain their structures without structural collapse even by the abstraction of much Li, and thereby achieved a battery with a high energy density.

This is also probably because much Li in the crystal structure or substitution of an electronegative element for oxygen in Examples 1 to 16 improved the discharge capacity or operating voltage and increased the energy density.

Table 1 also shows that the battery according to Example 2 has a lower initial energy density than the battery according to Example 1.

This is probably because substitution with a halogen element (bromine) with a larger ionic radius than chlorine in Example 2 blocked the Li ion diffusion path.

Table 1 also shows that the batteries according to Examples 3 and 4 have a lower initial energy density than the battery according to Example 1.

This is probably because a decrease in the electronegative fluorine content in Examples 3 and 4 resulted in a decreased operating voltage.

Table 1 also shows that the battery according to Example 5 has a lower initial energy density than the battery according to Example 1.

This is probably because Example 5 included no electronegative fluorine, and element substitution with iodine, which has a larger ionic radius than fluorine, decreased the operating voltage.

Table 1 also shows that the batteries according to Examples 6 to 8 have a lower initial energy density than the battery according to Example 1.

This is probably because the use of Co or Ni, which has a smaller orbital overlap with oxygen than Mn, in Examples 6 to 8 decreased the capacity due to an oxidation-reduction reaction of oxygen.

Table 1 also shows that the battery according to Example 9 has a lower initial energy density than the battery according to Example 1.

This is probably because Example 9 had a high $\alpha/\beta$. More specifically, excess capacity due to oxidation-reduction of oxygen, smaller effects of electronegative X, and a decrease in cation-anion interaction resulted in destabilization of the structure upon Li deintercalation.

Table 1 also shows that the battery according to Example 10 has a lower initial energy density than the battery according to Example 1.

This is probably because Example 10 had a low $\alpha/\beta$. More specifically, a decrease in the amount of charge compensation due to oxidation-reduction of oxygen and greater effects of electronegative X resulted in a decrease in electronic conductivity.

Table 1 also shows that the battery according to Example 11 has a lower initial energy density than the battery according to Example 1.

This is probably because a Li/Mn ratio of 1 in Example 11 resulted in an insufficient number of Li percolation paths and poor Li ion diffusibility.

Table 1 also shows that the battery according to Example 12 has a lower initial energy density than the battery according to Example 1.

This is probably because a Li/Mn ratio of 3 in Example 12 resulted in a decrease in an oxidation-reduction reaction of an available transition metal and an increase in an oxidation-reduction reaction of oxygen. This is also probably because excessive abstraction of Li in the crystal structure during initial charging destabilized the crystal structure and thereby decreased the amount of Li to be intercalated during discharging.

Table 1 also shows that the battery according to Example 13 has a lower initial energy density than the battery according to Example 1.

This is probably because a Li/Mn ratio of 0.5 in Example 13 resulted in regularly arranged Mn due to a lack of Li, which resulted in an insufficient number of Li ion percolation paths and poor Li ion diffusibility.

Table 1 also shows that the battery according to Example 14 has a lower initial energy density than the battery according to Example 1.

This is probably because anion defects in the initial structure in Example 14 resulted in a destabilized crystal structure due to oxygen desorption during charging, which resulted in decreased Li intercalation efficiency during discharging.

Table 1 also shows that the battery according to Example 15 has a lower initial energy density than the battery according to Example 1.

This is probably because a Li/Mn ratio of 2 in Example 15 resulted in a decrease in an oxidation-reduction reaction of an available transition metal and an increase in an oxidation-reduction reaction of oxygen. This is also probably because excessive abstraction of Li in the crystal structure during initial charging destabilized the crystal structure and thereby decreased the amount of Li to be intercalated during discharging.

Table 1 also shows that the battery according to Comparative Example 3 has a lower initial energy density than the battery according to Example 1.

This is probably because no substitution of electronegative X for oxygen in Comparative Example 3 resulted in a decrease in discharge capacity or operating voltage.

These examples show that satisfying $1.17 \leq x/y \leq 1.75$, $2.0 \leq \alpha/\beta \leq 14.0$, and $0.67 \leq (x+y)/(\alpha+\beta) \leq 0.95$ in the composition formula $Li_xMe_yO_\alpha X_\beta$ can further increase the initial energy density of the battery.

It is presumed from these results that the same advantages can also be obtained when Me in the composition formula $Li_xMe_yO_\alpha X_\beta$ is an element other than Mn or when part of X is an element other than F and Cl.

A positive-electrode active material for batteries according to the present disclosure can be utilized as a positive-electrode active material of batteries, such as secondary batteries.

What is claimed is:

1. A positive-electrode active material comprising a compound represented by a composition formula: $Li_xMe_yO_\alpha X_\beta$, where:

Me denotes one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er;

X denotes two or more elements selected from the group consisting of F, Cl, Br, I, N, and S;

x, y, $\alpha$, and $\beta$ satisfy $0.75 \leq x \leq 2.25$, $0.75 \leq y \leq 1.50$, $1 \leq \alpha < 3$, and $0 < \beta \leq 2$, respectively; and $\alpha$ and $\beta$ further satisfy $2.0 \leq \alpha/\beta \leq 5.0$,
wherein a crystal structure of the compound belongs to a space group Fm-3m.

2. The positive-electrode active material according to claim 1, wherein the compound is a main component.

3. The positive-electrode active material according to claim 1, wherein Me includes Mn.

4. The positive-electrode active material according to claim 1, wherein X includes F.

5. The positive-electrode active material according to claim 1, wherein x and y satisfy $0.5 \leq x/y \leq 3.0$.

6. The positive-electrode active material according to claim 5, wherein x and y satisfy $1.17 \leq x/y \leq 1.75$.

7. The positive-electrode active material according to claim 1, wherein $\alpha$ satisfies $2.05 \leq \alpha \leq 2.8$.

8. The positive-electrode active material according to claim 1, wherein $\beta$ satisfies $0.2 \leq \beta \leq 1.0$.

9. The positive-electrode active material according to claim 1, wherein x, y, $\alpha$, and $\beta$ satisfy $0.67 \leq (x+y)/(\alpha+\beta) \leq 1.15$.

10. The positive-electrode active material according to claim 1, wherein x, y, $\alpha$, and $\beta$ satisfy $0.67 \leq (x+y)/(\alpha+\beta) \leq 0.95$.

11. A battery comprising:
a positive electrode containing a positive-electrode active material;
a negative electrode; and
an electrolyte,
wherein the positive-electrode active material comprising a compound represented by a composition formula: $Li_xMe_yO_\alpha X_\beta$, where:
Me denotes one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er;
X denotes two or more elements selected from the group consisting of F, Cl, Br, I, N, and S;
x, y, $\alpha$, and $\beta$ satisfy $0.75 \leq x \leq 2.25$, $0.75 \leq y \leq 1.50$, $1 \leq \alpha < 3$, and $0 < \beta \leq 2$, respectively; and $\alpha$ and $\beta$ further satisfy $2.0 \leq \alpha/\beta \leq 5.0$,
wherein a crystal structure of the compound belongs to a space group Fm-3m.

12. The battery according to claim 11, wherein the negative electrode contains a negative-electrode active material that stores and releases lithium, and the electrolyte is a non-aqueous electrolyte solution.

13. The battery according to claim 11, wherein the negative electrode contains a negative-electrode active material that stores and releases lithium, and the electrolyte is a solid electrolyte.

14. A positive-electrode active material comprising a compound represented by a composition formula: $Li_xMe_yO_\alpha X_\beta$, where:
Me denotes one or more elements selected from the group consisting of Mn, Ni, Co, Fe, Al, Sn, Cu, Nb, Mo, Bi, Ti, V, Cr, Y, Zr, Zn, Na, K, Ca, Mg, Pt, Au, Ag, Ru, Ta, W, La, Ce, Pr, Sm, Eu, Dy, and Er;
X denotes two or more elements selected from the group consisting of F, Cl, Br, I, N, and S;
x, y, $\alpha$, and $\beta$ satisfy $0.75 \leq x \leq 2.25$, $0.75 \leq y \leq 1.50$, $1 \leq \alpha < 3$, and $0 < \beta \leq 2$, respectively; and x, y, $\alpha$, and $\beta$ further satisfy $0.67 \leq (x+y)/(\alpha+\beta) \leq 0.95$,
wherein a crystal structure of the compound belongs to a space group Fm-3m.

* * * * *